June 1, 1965    R. G. FRIEDMAN    3,186,209
METHOD OF COLD FORMING AN ELONGATED HOLLOW ARTICLE
Filed April 14, 1960    6 Sheets-Sheet 1

INVENTOR.
ROBERT G. FRIEDMAN
BY
RICHEY, McNENNY & FARRINGTON
ATTORNEYS

June 1, 1965 R. G. FRIEDMAN 3,186,209
METHOD OF COLD FORMING AN ELONGATED HOLLOW ARTICLE
Filed April 14, 1960 6 Sheets-Sheet 2

INVENTOR.
ROBERT G. FRIEDMAN
BY
RICHEY, MENENNY & FARRINGTON
ATTORNEYS

# United States Patent Office 3,186,209
Patented June 1, 1965

3,186,209
METHOD OF COLD FORMING AN ELONGATED HOLLOW ARTICLE
Robert G. Friedman, Tiffin, Ohio, assignor to The National Machinery Company, Tiffin, Ohio, a corporation of Ohio
Filed Apr. 14, 1960, Ser. No. 22,142
9 Claims. (Cl. 72—334)

This invention relates generally to the manufacture of hollow bodies of steel, and is concerned particularly with a process and an apparatus for cold forming elongated, hollow, open-ended bodies, such as spark plug shells, from shorter steel workpieces of solid cross-section.

In the manufacture of spark plug shells, the prior art commercial practice has been to start with a solid cross-section steel workpiece or blank which has a length and cross-sectional size at least as large as the corresponding dimensions of the finished shell. By suitable machining operations the material of the blank is removed to produce the finished hollow article of the necessary configuration to serve as a spark plug shell. This manufacturing technique involves a great waste of material, going from the original blank to the finished article.

Numerous attempts have been made to form a spark plug shell by successive piercing and drawing operations, some of which included cold working a blank. The prior art methods and apparatus for making spark plug shells, however, have included one or more annealing steps between the various forming operations. The sequence control of the blank is lost by batch annealing. Where it has been attempted to eliminate the annealing steps, the piercing and drawing steps have involved the use of a large number of work stations so that the savings in material over the screw machine methods have been offset by high die costs. The term "cold working" as used in the instant application means the working of the steel blank below the temperature of rapid grain growth or crystallization. I have found that the process of the instant application may be carried out at temperatures in the range of 400° F. to 500° F. and without the use of any annealing steps and with a relatively small number of work stations. Cold working eliminates the problems of scale and increases the strength of the article.

The present invention is directed to a novel cold forming process and an apparatus which avoids annealing difficulties, while still retaining the recognized advantage of reduced waste of material from the starting blank or workpiece to the finished product. In the present invention, there is no necessity to interrupt the continuity of the process to anneal or otherwise treat the workpiece. It is desirable to maintain the sequence control of the blank. Each die wears a little with each operation therein so that the last blank out of a die in a batch of several thousand blanks is larger than the first blank of the batch. Where sequence control is maintained the change in blank size is proportional in each die of a series. If a batch of blanks is annealed and the sequence is lost, an oversized blank may be placed in the die of the next work station in the series. Oversized and undersized blanks will result in defective articles.

In the present invention there are fewer cold forming operations involved, so that it is possible to produce finished articles of relatively complex shape, such as spark plug shells, on a machine previously used to produce other articles, such as nuts, using the same number of die stations and with a minimum of modification of the prior art machines.

It is an object of this invention to provide a novel and improved process for the manufacture of hollow bodies of steel.

It is also an object of this invention to provide such a process which avoids the necessity to interrupt the continuity of the process for the purpose of annealing the workpiece to restore its workability.

It is also an object of this invention to provide such a process which involves a reduced number of individual pressure-forming operations.

It is also an object of this invention to provide such a process in which the blank is worked in tools and which avoids excessive work hardening between work stations.

Another object of this invention is to provide such a process which results in the minimum of scrap and produces a better article than the prior art methods.

Another object of this invention is to provide such a process which enables relatively complex shaped bodies, such as spark plug shells, to be manufactured more economically.

Another object of this invention is to provide a novel and improved apparatus for cold forming hollow metal bodies which is capable of achieving the foregoing objectives.

Another object of this invention is to provide a spark plug shell having improved physical properties resulting from flow lines substantially corresponding to the contour of the spark plug shell.

Another object of this invention is to provide an apparatus and method for cold forming a spark plug shell to impart to it such improved physical properties.

Further objects and advantages of this invention will be apparent from the following detailed description of a presently-preferred embodiment thereof, which is illustrated in the accompanying drawings.

Figure 15:
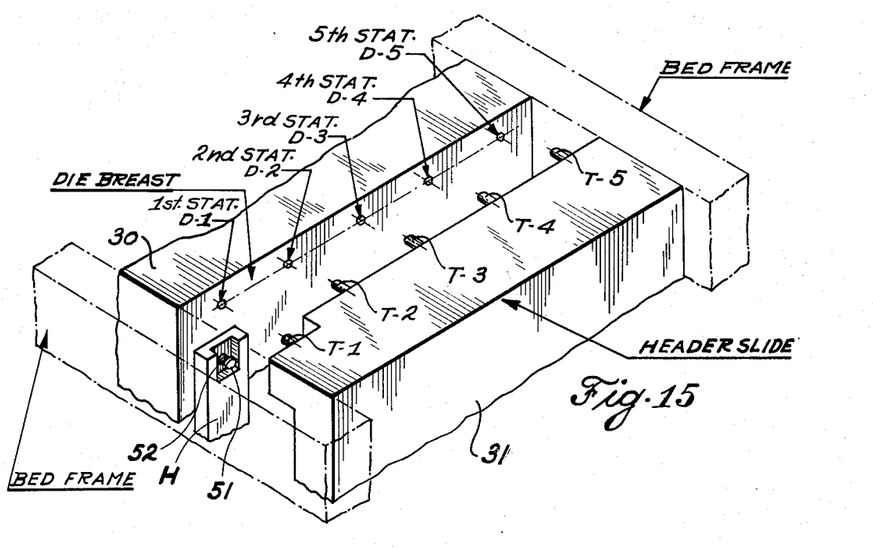
FIG. 15 is a fragmentary perspective view showing schematically the five pressure-forming stations employed in the manufacture of the finished article in accordance with the present invention.

Referring first to FIG. 15, this figure illustrates schematically the over-all arrangement of the five work stations used in the performance of the present process. Desirably, these five stations may be incorporated in a machine similar to that disclosed in U.S. Letters Patent No. 2,542,864, to J. H. Friedman. The machine comprises a die breast 30 having five work stations at which are located individual dies designated generally by the reference symbols D–1, D–2, D–3, D–4 and D–5 in FIG. 15. A header slide 31, which is reciprocable horizontally toward and away from the die breast 30, carries five individual tools T–1, T–2, T–3, T–4, and T–5 for cooperation with the respective dies at the five pressure-forming stations. The arrangement is such that, toward the end of the forward stroke of the header slide 31, the tools T–1–T–5 simultaneously perform operations on the individual blanks located at the five work stations.

A suitable transfer mechanism, not shown in FIG. 15, is provided for transferring each workpiece from one forming station to the next in the series before the header 31 makes its next forward stroke. This transfer mechanism may be basically similar to that shown in the aforementioned patent, except that in the present invention it does not turn the workpiece end-for-end between successive work stations. Various other types of transfer mechanism found in the prior art may be employed, if desired.

Ordinarily rolled rod or drawn wire stock embodies flow lines produced by the hot rolling of the material which lines extend axially of the stock and substantially parallel to each other. When such rod stock is machined in an automatic screw machine to form a spark plug body, the flow lines in the rod stock are cut transversely of the axis of the blank whenever there is a diameter change in the contour of the spark plug shell. Spark plug shells made according to the process of the instant application and with the apparatus disclosed herein have flow lines substantially conforming to the contour of the finished spark plug shell. The extrusion of the blank thoroughly works the metal by bunching the flow lines and bending the flow lines to follow the outer contour of the finished article. This results in a spark plug shell having the maximum strength which is developed by the cold working of the shell.

*First work station*

Figure 16:
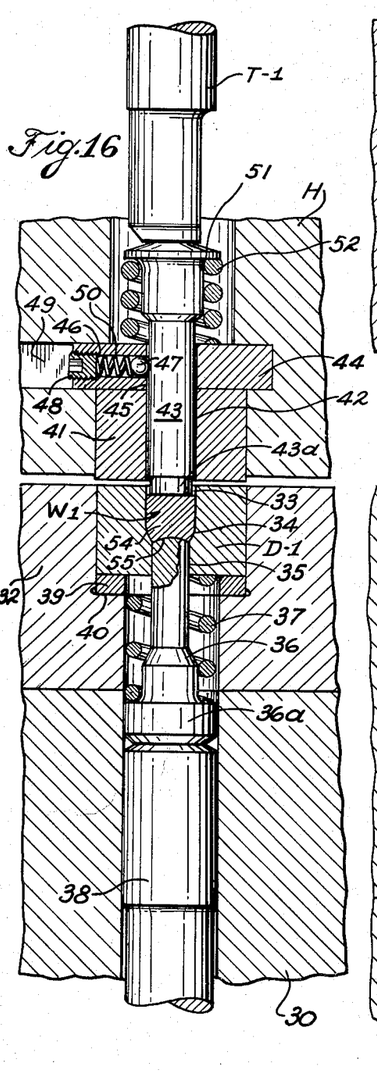
FIG. 16 is a sectional view showing the pressure-forming mechanism at the first station.

Referring now to FIG. 16, at the first pressure-forming or work station there is provided a die D–1, which is held in a die case 32 mounted on the die breast 30. The die D–1 is formed with a cavity 33 which is open at the front face of the die. This cavity is of uniform cylindrical shape rearward from its front face back to a location at 34 where its size is gradually reduced in diameter. A cylindrical passage 35 communicates with this reduced-diameter back end of the die cavity.

A knock-out plunger 36, which is reciprocably mounted in the die breast 30 and the die case 32, presents a reduced diameter front end which is slidably received in the passage 35 in the die D–1. A coil spring 37 is engaged under compression between the back end face of the die D–1 and an enlarged head 36A on the knock-out plunger 36. This spring-biases the front end of the plunger rearwardly away from the die cavity 33.

A knock-out 38, reciprocably mounted in the die breast 30, engages the back end of the plunger 36. The knock-outs are operated in timed sequence to header-slide movement as taught by the prior art machines.

The assembly at the die D–1 is completed by an annular filler plate 39, which is engaged between the back end face of the die D–1 and an internal, forwardly facing shoulder 40 formed in the die case 32.

Figure 1:
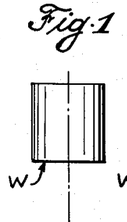
FIG. 1 is an elevational view of the starting blank from which the finished article is made in accordance with the present invention.

At the first work station, referring to FIGS. 15 and 16, there is provided a shear assembly H which is mounted for reciprocation vertically in timed relationship with the forward and return strokes of the horizontally reciprocating header slide 31. The shear assembly H carries a shear die 41 facing toward the die D–1 in the die breast 30. This shear die 41 is formed with a central, axial passage 42 which slidably receives a reciprocatory punch 43. The punch 43 has a reduced-diameter, cylindrical front end 43A which is dimensioned to be received loosely in the open front end of the die cavity 33, as shown in FIG. 16, when the shear assembly H is elevated from its lowered position shown in FIG. 15. The shear operation will be understood by those skilled in the art to include the following steps: (1) the wire or rod stock is fed into the machine by feed rolls or the like, (2) a length of such stock, as shown at W in FIG. 1, is fed into the shear die 41 when the shear die 41 is in its lowered position, (3) the shear die is then raised to effect a shearing or breaking of the stock, (4) when the shear die assembly H is raised the tool T–1 advances the sheared blank W into the die D–1 to form the blank W–1.

An annular plate 44 is mounted in the shear assembly H at the back end of the shear die 41. This plate is formed with an axial bore 45 which is the same diameter as the passage in the shear die 41 and is aligned therewith. At one side of the plate 44, there is provided a transversely extending passage 46 which at its inner end intersects the bore 45 and which is threaded at its outer end and open at the periphery of the plate 44. A ball 47, located at the inner end of the cross passage 46, engages the periphery of the punch 43 thereat. A set screw 48 is threadedly received in the outer end of the cross passage 46, this set screw being accessible for adjustment due to the provision of an opening 49 in the holder H at this location. A coil spring 50 is engaged under compression between the inner end of the set screw 48 and the ball 47. This spring-biases the ball 47 against the punch 43 so as to force the punch against the opposite side wall of the bore 45 in the plate 44, thereby applying a frictional drag on the punch so that it will not bounce out of the bore 42 in the shear die 41 when the tool T–1 is retracted.

At its back end the punch 43 is formed with an enlarged head 51. A coil spring 52 is engaged under compression between this head 51 and the back end of the plate 44. This spring-biases the punch 43 rearwardly with respect to the punch holder H. The effect of the spring 52 is dampened by the ball drag 47.

When the shear assembly H is elevated to a position in which the punch 43 is aligned with the die cavity at the first work station, the back end of the punch is positioned in the path of movement of the first tool T–1 on the header slide 31.

Figure 7:
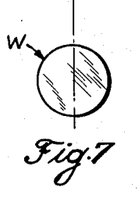
FIGS. 7, 8, 9, 10, 11, and 12 are top plan views of the workpiece in FIGS. 1–6, respectively.

In the operation of the machine at the first station, a workpiece or blank W of relatively short, solid, cylindrical shape, as shown in FIGS. 1 and 7, is pushed out of the shear die 41 into the die cavity 33. This starting blank is characterized by a rough fracture at the end faces found in a piece cut from a length of steel bar stock by transverse quill shearing. The tool header 31 is moved in its forward stroke toward the die breast 30, carrying with it the tool T–1. Toward the end of the forward stroke of the tool header, the tool T–1 strikes the punch 43 and moves it forward until its reduced diameter front end engages the outer end face of the workpiece W in the die cavity, forcing the workpiece back into the die cavity until back end face of the workpiece engages the rounded end face on the plunger 36. This operation eliminates the fractured characteristics of the end faces and "trues up" the blank.

Figure 2:
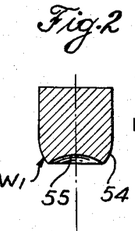
FIG. 2 is a lengthwise sectional view taken centrally through the blank or workpiece at the conclusion of the first pressure-forming operation in accordance with the present invention.
Figure 8:
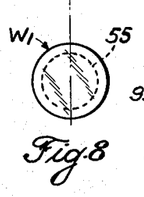
Figure 9:
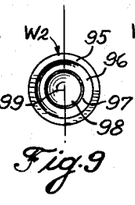
Figure 10:
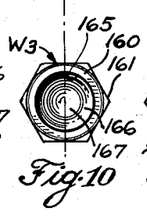
Figures 11, 12:
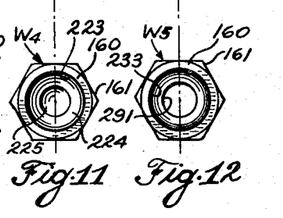

The workpiece W, by such application of pressure against its opposite end faces, is deformed until it conforms to the shape of the die cavity, becoming progressively smaller in diameter toward its back end and having an intended, rounded, concave back end face complementary to the rounded front end face of the plunger 36. At the conclusion of this pressure-forming operation, the originally cylindrical workpiece has been brought to the shape shown in FIGS. 2 and 8, where the reduced diameter end of the workpiece is designated generally by the reference numeral 54 and the depressed back end face of the workpiece is designated by the reference numeral 55. From a comparison of FIGS. 1 and 2, it will be apparent that the over-all length of the workpiece is increased only very slightly in the first pressure-forming operation and throughout most of the its extent its outside diameter remains substantially unchanged.

When the header slide 31 is retracted, the punch 43 is retracted by its spring 52 out of the die cavity. After the punch has been retracted, the workpiece is removed from the die D-1 by the action of the knock-out 38, which is actuated to force the plunger 36 forwardly to eject the workpiece $W_1$ from the die cavity 33. The ejected workpiece is received by the transfer fingers (not shown) and is advanced thereby to the second pressure-forming or work station before the header slide 31 advances again to the die breast 30.

Second work station

Figure 17:
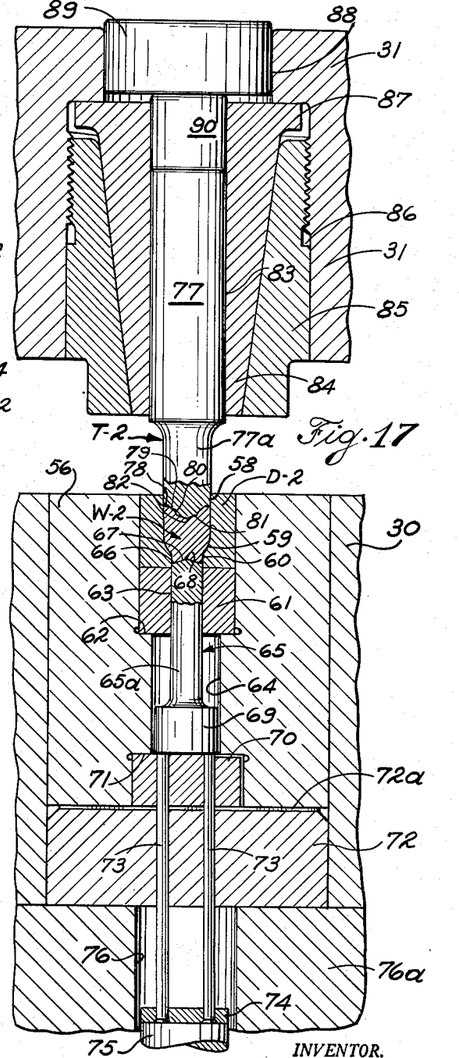
FIG. 17 is a similar view showing the pressure-forming mechanism at the second station.

Referring now to FIG. 17, at the second pressure-forming or work station there is provided a die case or holder 56 mounted in the die breast 30. A die D-2 is mounted in the die case, presenting a die cavity 58 which is cylindrical at the front end of the die and which toward its back end has an extrusion throat 59 which merges with a smaller diameter cylindrical portion 60 at the back end of the die. It will be understood that the extrusion throats in the dies of the instant application are preferably formed to provide sweeping entrance curves to result in large reductions and long life.

An annular filler plate 61 is engaged between the back end face of the die D-2 and a forwardly facing internal annular shoulder 62 on the die holder 56. This filler plate 61 is formed with an axial passage 63 which is aligned with the restricted diameter portion 60 of the die cavity and is of the same cross-sectional size and shape.

At the back end of the filler plate 61, the die case or holder 56 is formed with a cylindrical passage 64 which receives a piercer, designated generally by the reference numeral 65. The piercer 65 presents an elongated stem portion 65a which extends snugly, but slidably, through the passage 63 in the filler plate 61 and into the reduced diameter bottom portion 60 of the die cavity. The front end face of this stem includes a flat, forwardly facing, annular portion 66, which extends radially inwardly from the periphery of this stem, and a forwardly projecting conical portion 67 at the middle which provides a relatively sharp point 68 located precisely in line with the longitudinal axis of the die cavity.

At its back end the piercer 65 has an enlarged head 69 which is rather loosely received in the passage 64 in the die holder 56. The back end of this head normally engages the front end face of a pin guide plate 70. This pin guide plate 70 is engaged between a rearwardly facing annular shoulder 71 on the die holder and the front end face of a filler plate 72 mounted in the die breast 30. The filler plate is formed with a transverse air groove 72a in its front end face. The pin guide 70 and the filler plate 72 are formed with aligned lenthgwise passages which slidably receive knock-out pins 73. The front ends of the knock-out pins engage the back end face of the head 69 on the piercer 65. The back ends of the knock-out pins are secured to a head 74. This head 74 and a knock-out 75 which operates it are loosely received in a passage 76 formed in a face plate 76a behind the filler plate 72.

The header slide tool arrangement for coaction with the die D-2 at the second work station is designated in its entirety by the symbol T-2. It includes a punch 77 having a reduced diameter front end stem 77a, which is shaped and dimensioned to be snugly received in the front end portion 58 of the D-2 die cavity. The front end face of the punch presents a flat annular forwardly facing marginal portion 78, a frusto-conical portion 79 extending inwardly and forwardly from the inner edge of the annular portion 78, a curved, forwardly protruding portion 80 at the inner edge of the frusto-conical portion 79 and extending forwardly therefrom as a smooth continuation thereof, and a frusto-conical portion 81 at the center which projects forward from the inner edge of the curved segment 80, forming a sharp corner therewith. The frusto-conical portion 81 at the middle of the front end face of the punch defines a rather sharp point 82.

The back end of the punch 77 is of larger diameter and is slidably received in the cylindrical bore 83 of a punch holder 84. Throughout most of its extent, the punch holder 84 has a frusto-conical periphery which is snugly received in a complementary shape recess in an annular body member 85. The back end of this body member 85 is threadedly mounted in a cavity 86 in the header slide 31. At its back end the punch holder 84 is formed with a transverse flange 87 which is disposed in the back end of the cavity 86 behind the back end of the annular body 85. Behind this flange the header slide 31 is formed with a passage 88 which communicates with the recess 86 therein. A member 89 is mounted in this passage 88. A smaller diameter member 90 extends into the bore 83 in the punch holder 84 behind the punch therein and just ahead of member 90.

In the operation of this pressure-forming mechanism at the second work station, the workpiece which has been ejected from the first work station is inserted into the larger diameter front end 58 of the die cavity at the second work station. At this time the workpiece $W_1$ has the configuration shown in FIG. 2.

When the header slide tool is advanced, the front end of the punch 77 engages the flat back end of the workpiece $W_1$, deforming it to a configuration precisely complementary to the front end face of the punch. At the same time the rounded back end face of the workpiece is engaged by the front end face of the piercer 65 and is deformed to a configuration precisely complementary to that of the front end face of the piercer. That is to say, the workpiece in the die cavity is squeezed between the punch 77 and the piercer 65 and is extruded to the shape shown in FIG. 3.

Figures 3, 4, 5:
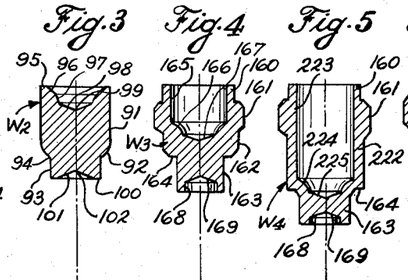
FIGS. 3, 4, 5 and 6 are corresponding views of the workpiece at the conclusion of the second, third, fourth, and fifth pressure-forming operations, respectively.

At the conclusion of the second pressure-forming operation, the workpiece $W_2$ (FIG. 3) has a cylindrical side wall 91 which merges with a smoothly curved portion 92 toward the extruded lower end of the workpiece in FIG. 3, and a smaller diameter cylindrical side wall 93 which forms a rather sharp corner 94 at its juncture with the inner end of the curved portion 92. At its upper end face in FIG. 3, the workpiece presents a flat, annular, marginal portion 95, a forwardly and inwardly extending frusto-conical portion 96 at the inside of the annular portion 95, a forwardly and inwardly extending curved portion 97 at the inner edge of the frusto-conical portion 96, and a forwardly and inwardly extending frusto-conical portion 98 which presents a sharp point 99 aligned with the axis of the workpiece. At its opposite end face, the workpiece presents a flat, annular, marginal portion 100 and a conical portion 101 at the inside of this marginal portion which presents a sharp point 102 at the central axis of the workpiece $W_2$.

The external diameter of the major part of the workpiece remains unchanged in the second pressure-forming operation, that is, the major portion 91 of the workpiece $W_2$ (FIG. 3) after the second operation has the same outside diameter as the major portion of the workpiece $W_1$ (FIG. 2) prior to the second pressure-forming operation.

However, in other respects the workpiece has been substantially altered by the second pressure-forming operation. Its over-all length is greater due to the extrusion. An extruded neck or shank 93 is provided at one end. A punch cavity 96–99 of substantial depth is provided at its opposite end.

After having been formed to this shape, the workpiece $W_2$ is ejected from the die D–2 at the second work station by the operation of the knock-out 75, which moves the knock-out pins 73 forwardly toward the die to force the piercer 65 further into the die and eject the workpiece therefrom. As the workpiece emerges from the die the second pressure-forming station, it is engaged by the transfer mechanism (not shown) and is then advanced immediately to the third pressure-forming station.

Metal working machines, such as bolt headers and nut forming machines, in current use include various expedients for causing movement of a header slide tool or stripper relative to the header slide. Apparatus for performing such operations is disclosed in Friedman Patent No. 2,667,650, issued February 2, 1954 which is owned by the assignee of the instant application. Such apparatus usually involves a lever carried or moved by the header slide and crankshaft. A double lever arrangement is found in Friedman Patent No. 2,705,333, issued April 5, 1955, wherein two different tool parts carried by the header slide may have independent movement relative to the header slide during the advance of the header slide towards the die breast. In the instant application levers carried by the header slide are employed at the third and fourth work stations. The apparatus of either of said Friedman patents may be used in these locations to cause movement of tool parts carried by the header slide so that such tool parts may be moved independently or at a different rate with respect to the work as compared to the header slide movements.

*Third pressure-forming or work station*

At the third work station (FIGS. 18 and 19) there is provided a die member D–3 having a die cavity which includes a hexagonal portion 104 at the entrance of the die and a smaller diameter cylindrical portion 105 at the back end of the die. The die D–3 presents a forwardly facing curved shoulder 106 between the larger hexagonal front cavity portion 104 and the smaller cylindrical back cavity portion 105. This die is shown in detail on an enlarged scale in FIG. 24.

Figure 24:
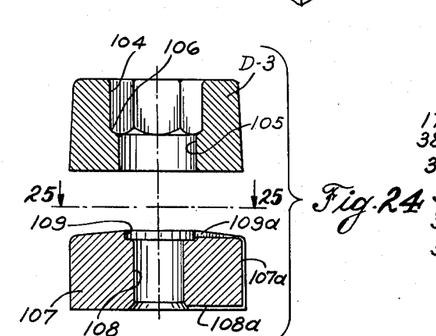
FIG. 24 is an enlarged, exploded lengthwise sectional view of the die arrangement at the third pressure-forming station (FIGS. 18 and 19)
Figure 25:
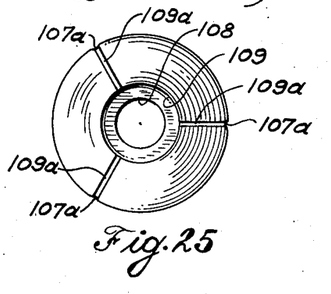
FIG. 25 is a plan view of the die insert member in that die arrangement viewed from the line 25—25 in FIG. 24.

An annular die insert 107 is located behind the die D–3. This insert has a cylindrical passage 108 therein which terminates at the front face of the insert in an enlarged cavity 109 which is of the same diameter as the back cavity portion 105 in the die D–3 and which is a continuation of the back cavity portion 105. As best seen in FIGS. 24 and 25, the die insert is formed with three evenly spaced radial air bleed grooves 109a which extend from the cavity 109 across the front face of the die insert, three similarly located air bleed grooves 108a which extend from the passage 108 radially across the back end face of the die insert, and peripheral air bleed grooves 107a which join each front face groove 109a to the correspondingly located back face groove 108. The angularity of the front face of the die insert 107 assures maximum contact pressure around the cavity 109 therein.

Figure 18:
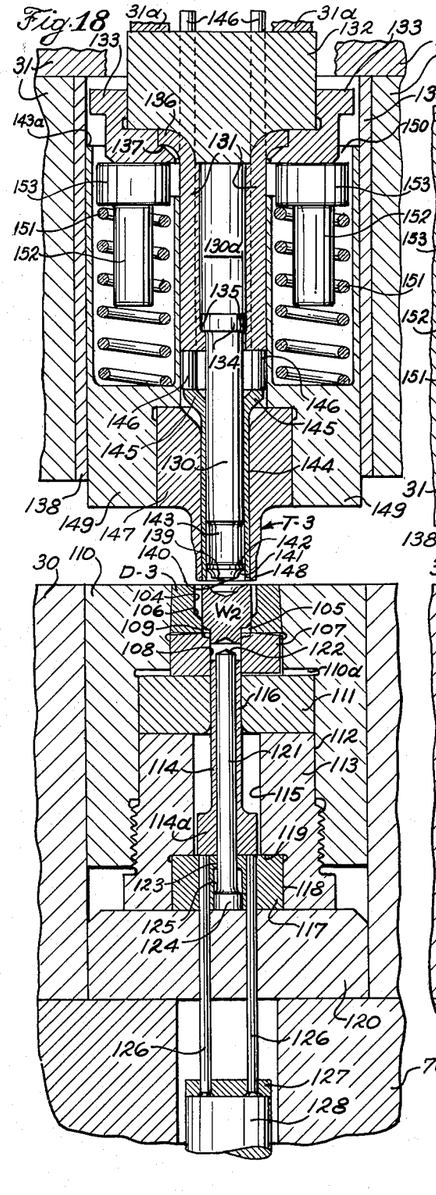
FIGS. 18 and 19 are similar views showing the pressure-forming mechanism at the third station in successive positions thereof during the forming operation at the third station.

The die D–3 and the die insert 107 are mounted in a die holder 110 which, in turn, is mounted in the die breast 30. Annular filler plate 111 engages the back end face of the die insert 107. This filler plate 111 is located in a generally cylindrical recess 112 formed in the die case 110. As shown in FIG. 18, an annular space 110a is provided in the die case 110 just in front of the filler plate 11. This space is to assure pressure against die D–3 and filler 107 while holding them in place. Air is bled down the side of a stripper sleeve 114. A generally cylindrical back-up bushing 113 is threadedly mounted in this recess 112 directly behind the filler plate 111.

Stripper sleeve 114 is reciprocably mounted in a central axial bore 115 in the back-up bushing 113. This sleeve presents an enlarged head 114a at its back end which is loosely received in the bore 115. The smaller diameter front end of the stripper sleeve 114 extends slidably through the central bore 116 in the filler plate 111 and into the back end of the cylindrical passage 108 in the die insert 107.

A pin guide plate 117 is mounted in an enlarged counterbore 118 formed in the back end of the back-up bushing 113 behind the bore 115 therein. The front end face of this guide plate engages a rearwardly facing annular internal shoulder 119 formed in the back-up bushing 113 at the intersection of the bore 115 and the counterbore 118. A filler plate 120 is mounted in the die block 30 behind the pin guide plate 117 and the back-up bushing 113.

An elongated piercer 121 extends axially through the stripper sleeve 114, the sleeve being freely slidable on the piercer 121. The piercer 121 includes a conical front end face 122 which normally is located a short distance forwardly beyond the front end of the stripper sleeve 114, as shown in FIG. 18. The back end of the pierce extends through an axial bore 123 in the pin guide plate 117. At its extreme back end, the piercer presents an enlarged head 124 which is slidably received in a counterbore 125 in the back end of the pin guide plate 117, just in front of the filler plate 120. The counterbore 125 is longer than the head 124 on the piercer so as to allow the piercer to move forward during the knockout operation.

A plurality of elongated knock-out pins 126 extend slidably through corresponding bores in the filler plate 120 and in the pin guide plate 117. The front ends of these knock-out pins 126 engage the back end face of the stripper sleeve 114. The back ends of the knock-out pins 126 are received in a head 127 which is actuated by a knock-out 128 mounted for reciprocation on the die breast 30.

The starting position of the parts in the die assembly is as shown in FIG. 18. However, when the knock-out 128 is actuated forward, it forces the knock-out pins 126 forwardly toward the die and these pins in turn force the stripper sleeve 114 lengthwise along with the piercer 121 toward the front end of the die. As the blank W–3 leaves passage 108 the piercer 121 is stopped by the bottom of counterbore 125 while the stripper sleeve 114 continues on and removes blank W–3 from the piercer and the die D–3.

The tool assembly T–3 which cooperates with the die assembly D–3 at the third work station includes an elongated punch 130, a separate stub shaft 130a behind the punch, an elongated sleeve member 131 which extends around the stub shaft 130a and the punch at the end thereof remote from the die D–3. A plate 132 which engages the end of the stub shaft 130a is arranged to be advanced relative to the header slide 31 by cam lever 132b. An annular filler plate 133 extends around the front end of the plate 132 and the back end of the generally tubular member 131.

As shown in FIG. 18, the punch 130 at its back end is formed with a slightly enlarged shoulder 134 which seats against an internal shoulder 135 in the sleeve member 131. The back end of the sleeve member 131 is turned out to provide a flange 136 which is engaged between the plate 132 and a rearwardly facing shoulder 137 formed on the annular filler plate 133.

The unitary assembly of the punch 130, stub shaft 130a, sleeve member 131, and plates 132 and 133 is slidably disposed in a cylindrical bushing 138 which is mounted in the header slide 31.

The front end of the punch 130 presents a centrally located conical portion 139 terminating in a sharp point 140 aligned with the axis of the punch. The front end of the punch 130 also presents an annular concave portion 141 extending around the conical portion 139. This annular concave portion 141 is of gradually increasing diameter away from the tip of the punch. At its back end this concave portion 141 terminates in an enlarged shoulder 142, which is of slightly larger diameter than the adjoining cylindrical portion 143 on the punch.

Throughout most of its extent at its front end, the punch 130 extends lengthwise through a sleeve 144, being slidable therein. The back end of this sleeve 144 presents an enlarged flange 145 located in front of the sleeve 131. A plurality of knock-out pins 146 extend slidably lengthwise through the sleeve member 131 and have their front ends engaging the back end face of the sleeve 144.

A punch holder 147 extends around the sleeve 144 and is slidable with respect thereto. This punch holder 147 presents a reduced diameter hexagonal punch nose 148 at its front end which is dimensioned to be slidably received snugly in the hexagonal front end portion 104 of the cavity in die D-3.

The punch holder 147 is mounted in a holder 149 of generally annular configuration. The holder 149 is slidably received in the bushing 138. The holder 149 presents a plurality of spaced cylindrical cavities 150 which are open at one end. Each of these cavities 150 receive a compression coil spring 151. Each of these springs 151 is provided with a guide pin having a stem 152 received loosely in the spring and an enlarged head 153 which is engaged between the back end of the spring and the front face of the annular plate member 133 associated with the punch 130. The front end of each spring 151 engages the front end of the cavity 150 in the holder 149.

The header slide 31 includes an adjusting wedge 31a which adjusts the member 132, the stub shaft 130a and the punch 130 in a fixed position relative to the header slide. The sub-assembly, including 147 and 149, surrounding the punch 130 may be considered as a spring capsule which is biased forwardly from the face of the header slide 31 adjacent the die breast 30. The forward limit of the projection of the sub-assembly 147-149 is determined by the shoulder 156 (FIG. 19) as described hereinafter. The springs 151 in the spring capsule assembly normally bias the sub-assembly to its most forward position relative to the header slide. This position is illustrated in FIG. 18.

Figure 19:
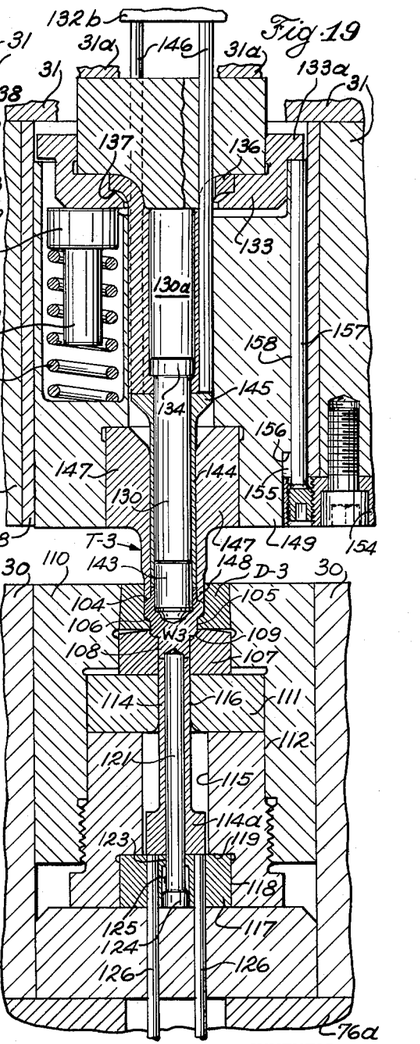

Referring to FIG. 19, the bolster plate 154 is bolted to the front of the header slide 31. The holder 149 in the tool assembly is formed with a peripheral recess 155 which is open at the front ends of the holder 149 and into which the bolster plate 154 projects. The holder 149 presents a forwardly facing shoulder 156 at the back end of recess 155 which is positioned to engage the back of the bolster 154 to limit the movement of the holder 149 forwardly with respect to the header slide 31.

A plurality of elongated stop pins 157, located just inside the bushing 138, are received in corresponding grooves 158 formed in the periphery of the holder 149. These pins do not interfere with the movement of the holder 149 slidably with respect to the tool header slide 31. The front ends of the stop pins 157 are threadedly mounted in the bolster plate 154. The back ends of these stop pins engage the front face of an annular flange 133a on the annular filler plate 133.

In the normal position of the parts shown in FIG. 18, when the tool header is retracted with respect to the die breast, the springs 151 bias the holder 149 to a position in which its shoulder 156 engages the back of the bolster plate 154. This is the extreme forward position of the holder 149 with respect to the header slide 31. As already mentioned, at this time the annular, hexagonal punch nose 148 on the punch holder 147 is substantially even with the front face of the punch 130.

As the header slide 31 is advanced toward the die breast 30 in the third work station, the outer end portion 148 of the member 147 is advanced into the entrance of the die D-3. The workpiece W-2 is forced downwardly into the die D-3 by the advancing motion of the punch 130, the tool holder 148 and the sleeve 144. As resistance is encountered by the tools against the workpiece, the tool holder 148 acting through member 149 compresses the spring 151 and thus the spring capsule assembly 147-149 is permitted to drift back into the header slide as the punch continues its advance in motion into the blank until it reaches the position illustrated in FIG. 19.

The cam lever 132b carried by the header slide engages the outer ends of the pins 146 and the difference in forward travel of the lever 132b and the header slide 31 permits the pins 146 to move back away from the die breast and thus, in turn, permits the sleeve 144 to move back along the punch and the metal displaced by the punch flows into the space between the punch and the tool holder 148 so as to form the thin skirt portion 160 at the end of the blank. The cam lever 132b is preferably operated by means such as that illustrated in said Friedman Patent No. 2,705,333.

When the blank is completely formed at the third work station the resulting blank W-3 is stripped off of the punch 130 and held in die D-3. Stripper pins 146 force the stripper sleeve 144 along the punch 130. In effect, sleeve 144 temporarily remains motionless in relation to the die breast 30 as the header slide 31 retracts. Pins 157 prevent stripping against the springs 151. After the blank W-3 is off of the punch 130 the springs 151 return the tool holder 180 to its normal position, shown in FIG. 18. After the header slide has been retracted, the workpiece is ejected from the die D-3 in response to the forward movement of the knock-out 128, which forces the knock-out pins 126 forward toward the die, these pins 126 in turn forcing the knock-out sleeve 114 toward the outer end of the die to push the workpiece out of the die. The sleeve 144 and retraction of punch 130 have stripped the blank off of the punch 130 and held it in the die. As the workpiece is ejected from the die at the third pressure-forming station, it is engaged by the transfer mechanism and is then advanced to the fourth pressure-forming station before the header slide 31 again reaches the die breast 30.

It will be noted that in this operation the material of the workpiece is extruded around the front end of the punch 130, forming a larger diameter hexagonal portion and a cylindrical skirt portion at the back end thereof inside the nose 148 on the punch holder 147.

At the end of the forward stroke of the header slide 31 the workpiece has the configuration shown in FIG. 4 with a tubular skirt 160 at one end, a larger diameter hexagonal portion 161 adjoining the skirt 160, a somewhat smaller cylindrical portion 162 adjoining the hexagonal portion 161, a substantially smaller cylindrical skirt 163 just beyond the portion 162, and a flat, annular shoulder 164 at the juncture between the cylindrical portions 162 and 163. The cylindrical portions 160 and 162 of the workpiece $W_3$ are of the same cross-sectional size as the major portion 91 of the workpiece $W_2$ (FIG. 3) prior to the third pressure-forming operation. The hexagonal portion 161 is substantially larger. At the end where the annular skirt 160 is located, the workpiece has a cavity open at that end which has a cylindrical portion 165 extending down into the workpiece to a location almost to the opposite end of the hexagonal portion 161, a convex annular portion 166 at the inner end of the cylindrical portion 165 and of gradually diminishing diameter, and a conical closed end 167 in the portion of the workpiece mounted by the cylindrical side wall 162. At its opposite end, the workpiece has a cavity of substantially shorter axial length which includes a cylindrical portion 168 at the outer end and a conical portion 169 at the inner end.

Thus, as a result of the third pressure-forming operation, the over-all length of the workpiece is substantially increased, the punch cavity 165-167 is substantially lengthened, the enlarged external hexagonal portion 161 is formed, the reduced diameter shank 163 is substantially lengthened. The cavity 168, 169 is formed in the inner end of the workpiece, and the axial thickness of the workpiece at the center is appreciably reduced.

*Fourth work station*

At the fourth work station (FIGS. 20 and 21), there is provided a die D-4 having a die cavity which includes a hexagonal portion 71 at the entrance to the die, a cylindrical portion 172 of somewhat smaller diameter at the middle of the die, and an even smaller diameter cylindrical portion 173 at the back end of the die. This die is shown in enlarged detail in FIG. 26. The die presents a forwardly facing, curved annular shoulder 174 at the juncture between the cavity portions 171 and 172 and a similar shoulder 175 at the juncture between the cavity portions 172 and 173. The hexagonal portion 171 of the die cavity is dimensioned to snugly, but slidably, receive the hexagonal portion 161 on the workpiece W-3 (FIG. 4). The cylindrical portion 173 of the die cavity is dimensioned to snugly, but slidably, receive the cylindrical portion 162 of the workpiece W-3.

Figure 26:
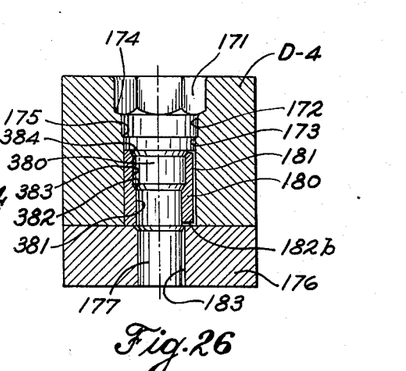
FIG. 26 is an enlarged, lengthwise sectional view of the die arrangement at the fourth pressure-forming station (FIGS. 20 and 21).

An annular filler plate 176 is located behind the die D-4. This filler plate has a central passage 177 therein which is open at each end and which communicates with the back end portion 173 of the die cavity.

Both the filler plate 176 and the die D-4 are received in a cylindrical cavity 178 formed in the die case 179.

An annular die insert 180 is snugly received in the back end portion 173 of the die cavity in die D-4. As best seen in FIG. 26, the die insert 180 has an axial passage, designated in its entirety by the reference numeral 380, which is open at each end. The back end portion 381 of this passage is cylindrical and of the same diameter as the passage 177 in filler plate 176. Immediately in front of this back end portion 381 the passage in the die insert presents a short, outwardly flared section 382, and in front of this a larger diameter cylindrical portion 383. The front end of the portion 383 connects with a short, outwardly flared section 384 at the front end of the die insert.

The die insert 180 is formed with a plurality of lengthwise grooves 181 in its periphery and correspondingly located radial grooves 182 at the back end face of the die insert. These grooves in the die insert communicate at the front end of the die insert with the interior of the die cavity, and at the back end of the die insert they communicate with correspondingly located lengthwise grooves 183 in the filler plate 176 at the bore 177 therein. The grooves insure the venting of air from the die assembly during the forming operations.

The die case presents a flat annular forwardly facing shoulder 184 at the back end of its cavity 178. The back end face of the filler plate 176 engages this shoulder. Behind this shoulder the die case is formed with a cylindrical passage 185 which communicates with the groove 183 in the filler plate 176.

The assembly at the die also includes a piercer 186 having an enlarged head 187 at its back end which is loosely disposed in the passage 185 in the die case. The stem of this piercer extends slidably through the bore 177 in the filler plate 176 and slidably into the annular die insert 180, being snugly, but slidably, received in the back end portion 381 of the passage in the die insert. At its front end, the piercer has a reduced diameter nose with a conical tip 188.

Figure 20:
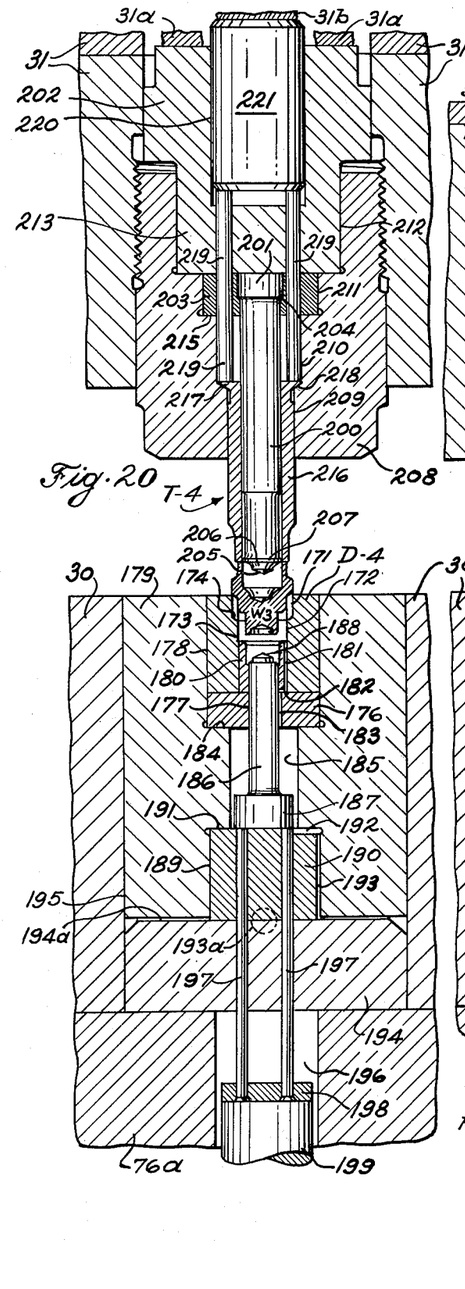
FIGS. 20 and 21 are similar views showing the pressure-forming mechanism at the fourth station in successive stages of its operation.

At the back end of the passage 185, the die holder 179 is formed with a generally cylindrical cavity or recess 189 which is of larger diameter than the passage 185. A knock-out pin guide plate 190 is disposed in this cavity with its front end face engaging an annular rearwardly facing shoulder 191 formed at the juncture between the passage 185 and the cavity 189. This pin guide plate 190 is formed with a plurality of radial grooves 192 in its front end face which communicate with lengthwise grooves 193 in its periphery.

A filler plate 194 is located behind the pin guide plate 190 in engagement therewith and in engagement with the back end of the die case 179. This filler plate 194 and the die case 179 are both mounted in a cylindrical recess 195 formed in the die breast 30. The filler plate 194 has an air vent 194a ground across its face which bears against the die case 179.

A smaller diameter passage 196 intersects this recess 195 at the back end of the filler plate 194. A plurality of elongated knock-out pins 197 extend slidably through corresponding bores in the filler plate 194 and the pin guide plate 190. The front ends of these pins engage the back end of the peircer 186. The back ends of the knock-out pins 197 are received in a head 198 which is actuated by a reciprocatory knock-out 199 in the passage 196 in the die breast 30.

The starting position of the parts in the die assembly at the fourth work station is as shown at FIG. 20. However, when the knock-out 199 is actuated, it forces the knock-out pins 197 forward and these pins in turn force the piercer 186 forwardly toward the outer end of the die D-4.

The tool assembly T-4 which cooperates with the die at the fourth pressure-forming station includes an elongated punch 200 having an enlarged head 201 at its back end and a stripper pin case 202 whose front end engages this head on the punch. The head 201 on the back end of the punch is received in a recess formed in an annular seat plate 203, which presents an annular rearwardly facing shoulder 204 for engagement by the front edge of the punch head 201.

At its opposite, front end the punch terminates in a conical tip 205 joined to a curved portion 206 of gradually increasing diameter away from the tip of the punch, and an enlarged shoulder 207 behind this curved portion.

A generally annular tool holder 208 is threadedly mounted in a recess in the header slide 31. This tool holder is formed with a cylindrical passage 209 open at its front end, and larger diameter chamber 210 behind the passage 209. A larger cylindrical chamber 211 is behind the chamber 210, and finally a larger cylindrical recess 212 at its back end.

The stripper pin case 202 has a reduced diameter front end portion 213 which is snugly received in the recess 212 in the tool case 208.

The punch seat plate 203 is snugly received in the recess 211 in the tool case, with its front end face engaging a rearwardly-facing shoulder 215 formed on the tool case at the juncture between the chambers 211 and 210 therein.

A stripper sleeve 216 is slidably mounted on the punch 200 and is slidably received in the cylindrical passage 209 in the tool holder 208. The stripper sleeve 216 is formed with an enlarged conical back end flange 217, which is slidable in the chamber 210 in the tool holder. This flange 217 normally rests against a correspondingly shaped, rearwardly facing internal shoulder 218 formed on the tool case at the juncture between the passage 209 and the chamber 210 therein.

A plurality of elongated stripper pins 219 extend slidably through corresponding bores in the stripper pin holder 202 and the punch seat plate 203. The front ends of the stripper pins 219 are slidably received in the chamber 210 in the tool case. The back end face of the stripper sleeve 216 is engaged by these pins.

The stripper pin holder 202 is formed with a cylindrical recess 220 which slidably receives knock-out plunger 221. The front end of this knock-out plunger engages the back ends of the stripper pin 219.

In the operation of the punch and die mechanism at the fourth pressure-forming station, the workpiece which has just been ejected from the third station is positioned by the transfer mechanism in front of the cavity in the die D-4. At this time, the workpiece W₃ has the configuration shown in FIG. 4.

When the header slide 31 is moved in its forward stroke, the front end of the stripper sleeve 216 first engages the back end of the workpiece. Until the nose of the punch engages the inner end of the cavity 165–167 in the workpiece, the stripper sleeve 216 will be held stationary by its engagement with the back end of the workpiece, so that the punch seat 203, which moves in unison with the punch, will move forward toward the back end 217 of the stripper sleeve.

When the punch engages the inner end of this cavity in the workpiece, it forces the workpiece down into the die cavity until the opposite end of the workpiece engages the piercer 186, which is held stationary at this time. By the action of the punch, the material of the workpiece is extruded around the punch so that it assumes the configuration shown in FIG. 5. During such cold forming or extrusion of the workpiece, the punch cavity is deepened and at the same time the former cylindrical portion 162 midway along the workpiece is lengthened appreciably to provide the portion 222 in FIG. 5. This action takes place by the squeezing of the workpiece between the punch nose 205–207 and the piercer nose 188, with the material of the workpiece flowing around the punch to fill the portions 172 and 173 of the die cavity.

Figure 21:
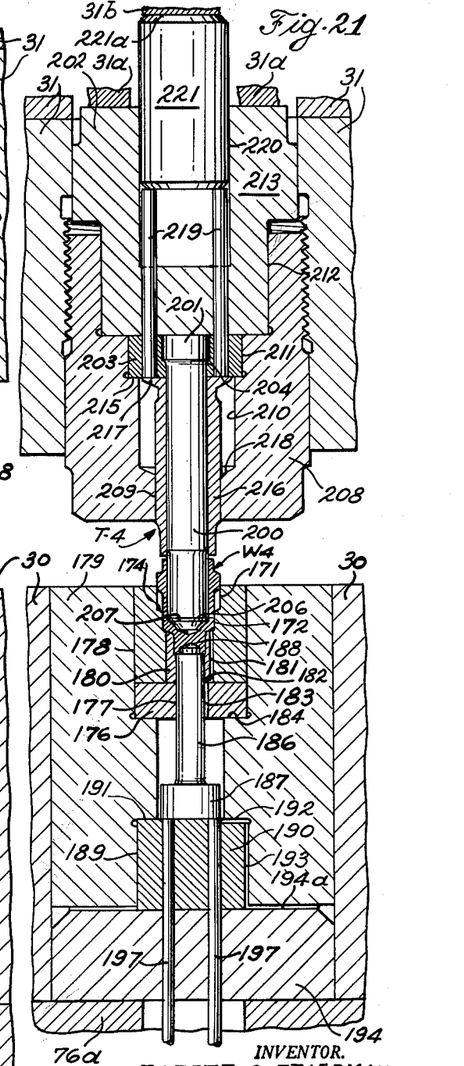

The resistance of the workpiece to deformation is effective to hold the stripper sleeve 216 substantially stationary while the punch 200 continues to move forward. At the completion of the punch stroke, the flanged back end 217 of the knock-out sleeve 216 must never engage the front face of the punch seat 203.

The grooves 181, 182, and 183 provide for the relief of air pressure into the chamber 185. Further pressure relief is provided by the grooves 192 and 193 which communicate with the opening 193a in the die breast 30 leading to the atmosphere.

As the punch is being retracted after deforming the workpiece, the stripper sleeve 216 holds the blank W-4 in the die D-4. After the punch 200 is fully removed from blank W-4 the stripper sleeve 216 retracts. The stripper sleeve 216 is moved forward when the plunger 221 is actuated by header slide levers engaging the end 221a. Reference is made to Friedman U.S. Patent No. 2,705,333, issued April 5, 1955. The tools of the instant application are preferably moved relative to the header slide 31 by lever arrangements and disclosed in said Friedman Patent No. 2,705,333, which is owned by the assignee of the instant application.

After punch 200 has retracted, with stripper sleeve 216, the workpiece is ejected from the die D-4 by the piercer 186, which moves forward under the urging of the knock-out pins 197 operated by the knock-out 199.

As the workpiece is removed from the die D-4 in this manner, it is engaged by the transfer mechanism, which moves it over to the fifth pressure-forming station.

At the completion of the fourth pressure-forming operation, the workpiece has the configuration shown in FIG. 5.

As shown therein, the reduced diameter end 163 of the workpiece has had no substantial change in configuration, the cavity defined by the walls 168 and 169 being the same. Also, there is substantially no change in the external configuration of the opposite end of the workpiece, the annular end 160 and the hexagonal portion 161 remain unchanged. However, the portion between the inner end of the hexagonal portion 161 and the reduced diameter end 163 is substantially lengthened, providing a generally cylindrical wall 222 which is substantially longer than the corresponding portion 162 on the workpiece prior to the fourth pressure-forming operation. The workpiece now has an elongated cavity which includes a cylindrical portion 223 extending down almost to the inner end of the cylindrical side wall 222, a curved, inwardly constricted portion 224, and a closed conical end 225 which is separated from the conical inner end wall 159 of the other cavity by only a relatively small thickness of the workpiece material.

Fifth work station

Figure 22:
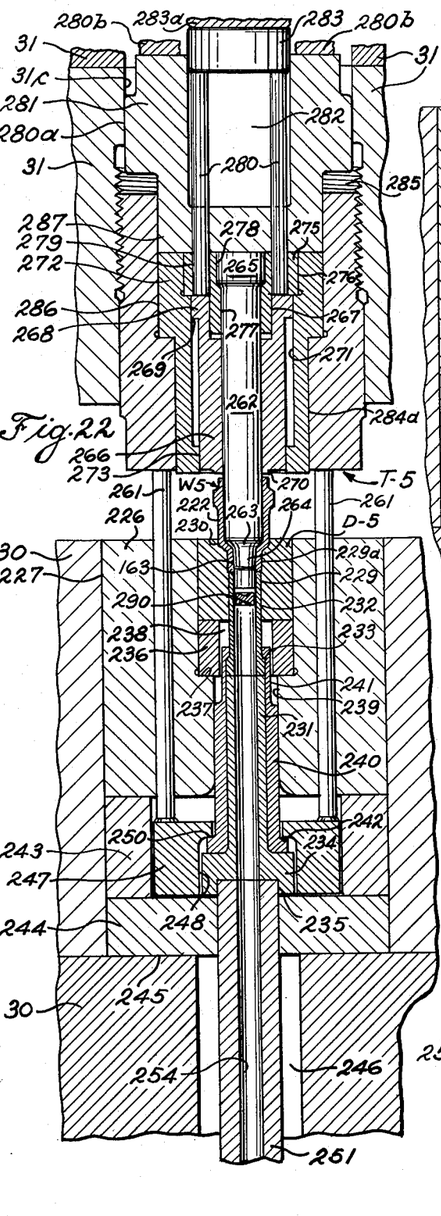
FIGS. 22 and 23 are similar views showing the forming mechanism at the fifth station in successive stages of the operation thereof.
Figure 23:
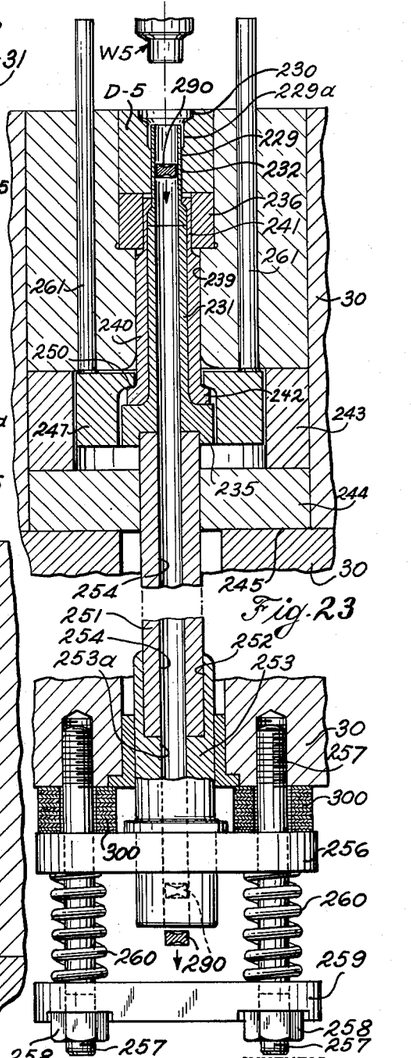

At the fifth work station, referring to FIGS. 22 and 23, there is provided a die holder 226 mounted in a cylindrical recess 227 in the die breast 30 and holding a die D-5. This die D-5 is formed with an elongated cylindrical recess 229 which terminates at its outer end in a slightly larger cylindrical recess 229a, which in turn leads to a substantially larger diameter cylindrical recess 230 open at the front end of the die. As shown in FIG. 22, the die recess 230 is dimensioned to snugly, but slidably, receive the intermediate cylindrical portion 222 of the workpiece while the recess 229a is dimensioned to snugly, but slidably, receive the reduced diameter inner end 163 of the workpiece.

A knock-out sleeve 232 is slidably received in the recess 229 in the die. The knock-out sleeve has an enlarged portion at its back end which presents a forwardly facing annular shoulder 233. A back-up sleeve 231 engages the back end of the knock-out sleeve 232. Sleeve 231 has an enlarged portion 234 at its back end which presents a forwardly facing annular shoulder. A cylindrical recess 235 is formed in a back end face of the back-up sleeve 231.

An annular filler plate 236 is engaged between the back end of the die D-5 and a forwardly-facing, annular, internal shoulder 237 on the die holder 226. This filler plate is formed with an axial bore 238 which is co-axial with the die recess 229 and is of substantially larger diameter.

Behind the annular filler plate 236, the die case or holder 226 is formed with an annular passage 239 which is of larger diameter than the bore 238 in the filler plate 236. A sleeve member 240 is slidably disposed in this passage 239, extending slidably around the sleeve 231 and the back end of the knock-out sleeve 232. The sleeve member 240 is formed with a reduced diameter front end 241 which is loosely received in the bore 238 in the filler plate 236. At its front end the sleeve member 240 presents an internal rearwardly facing shoulder which is engaged by the shoulder 233 on the knock-out sleeve 232. At its back end, the sleeve member 240 is formed with an enlarged annular flange 242 disposed just in front of the flange 230 on the sleeve member 231.

An annular plate 243 is located in the die breast recess 227 directly behind the die case 226. The plate 243 is engaged between the back end of the die block 226 and the front face of another annular plate 244. The back end face of the plate 244 engages a forwardly facing annular shoulder 245 at the back end of the die holder recess 227. The die block is formed with a passage 246 which extends rearwardly from the chamber 227.

Inside the annular plate 243 there is provided an annular member 247 having a substantially shorter axial length than the plate 243. The annular member 247 is freely slidable inside the plate 243 between the front end of the plate 244 and the back end of the die case 226. The annular member 247 is formed with a cylindrical recess 248 open at its back end and a smaller diameter bore 249 open at its front end. At the juncture between the bore 249 and the recess 248, the annular member presents a rearwardly facing annular internal shoulder 250. The flanges 234 and 242 on the sleeve members 231 and 240 are disposed in the chamber 248, with the flange 242 engaging the shoulder 250.

A sleeve 251 has its front end received in the recess 235 in the back end of the sleeve 231. This sleeve 251 extends slidably through the annular plate 244 and is loosely disposed in the passage 246 in the die block 230. As shown in FIG. 23, the back end of the sleeve 251 is snugly received in a forwardly facing socket 252 formed in the front end of a shaft 253.

The knock-out sleeve 232, the sleeve 231, the sleeve 251 and the shaft 253 together define a continuous axial passage 254 extending from the die D–5 to the front of the machine. This axial passage 254 allows the pierced slug 290 to pass through the passage to the front of the machine where it drops into the scrap basket.

The shaft 253 is formed with an enlarged collar 255 which is engaged by a spring-mounted plate 256. As shown in FIG. 23, the plate 256 is slidably mounted on a pair of bolts 257 which are threadedly attached to the back of the die breast 30. Nuts 258 are threadedly mounted on the outer ends of these bolts. A second plate 259 is engaged by these nuts. Coil springs 260 are engaged under compression between the plates 259 and 256. Spacing washers 300 on the bolts 257 are disposed between the die breast 30 and the plate 256.

With this arrangement, the springs 260 bias the shaft 253 and the members carried thereby to a forward position as limited by spacing washers 300. However, the shaft 253 and the associated parts may be retracted against the force exerted by these springs by the header slide tools.

The assembly at the die block is completed by a plurality of elongated retractor pins 261. Each of these retractor pins has its back end engaging the front end face of the plate 247. The pins 261 extend slidably through corresponding bores in the die holder 225, and in response to the bias of springs 260 the ends of the pins 261 project beyond the front end face of the die holder in a position to be retracted by engagement with the header slide tool at the fifth work station.

The tool arrangement T–5 at the fifth station comprises an elongated punch 262 which towards its forward end presents a curved segment 263 of gradually decreasing diameter and terminates in a tapered nose 264. The main body portion of the punch is dimensioned to be slidably received in the cylindrical portion 223 of the workpiece (FIG. 5). At its opposite end the punch is provided with an enlarged head 265.

A generally cylindrical punch holder 266 is slidably mounted in the header slide 31 and also on the punch 262. At its back end, the punch holder 266 is formed with a cylindrical socket 267. Also at its back end the punch holder 266 presents a flange 268 of larger diameter which provides a forwardly facing annular shoulder 269. At its front end, the punch holder 266 is formed with a reduced diameter forwardly projecting annular nose 270 for engagement with the end of the workpiece, as described in detail hereinafter.

The enlarged back end flange 268 on the punch holder is slidably received in a cylindrical chamber 271 formed in a generally tubular body member 272. This body member is formed with a reduced diameter bore 273 at its front end which slidably receives the front end of the punch holder 266. At the back end of its bore 273, the body member 272 presents a rearwardly facing annular shoulder 274 for engagement by the shoulder 269 on the punch holder 266 to limit the movement of the punch holder 266 forwardly with respect to the punch 262.

A pin guide plate 275 is snugly received in a cavity 276 formed in the back end of the body member 272. This pin guide plate is formed with a reduced diameter front end 277 which extends snugly into the cavity 267 in the back end of the punch holder 266. The pin guide plate 275 is formed with an axial bore 277 which snugly receives the main portion of the punch 266 and an enlarged counterbore 278 at its back end which snugly receives the enlarged head 265 on the punch. The pin guide plate 275 is formed with a plurality of passages 279 which slidably receive pins 280.

A block 281 engages the back ends of the annular body member 272 and the pin guide plate 275. This block is formed with bores which slidably receive the pins 280. At their back ends these bores lead into a chamber 282 open at the back end of the assembly which slidably receives a reciprocatory member 283. The member 283 is moved relative to the header slide 31 by means such as disclosed in said Friedman Patent No. 2,705,333.

A tool case 284 is threadedly mounted in a cavity 285 formed in the header slide 31 just in front of the bore 31c therein. The tool case is formed with an axial bore 284a which snugly receives the smaller diameter front end of the annular member 272. At its back end, the tool case is formed with an enlarged counterbore 286 which snugly receives the large diameter back end of the annular member 272 and the reduced diameter front end 287 of the block 281.

The operation which takes place at the fifth work station is as follows:

As the header slide 31 moves in its forward or advance stroke it caries with it the punch 262. The workpiece, having the configuration shown in FIG. 5, is inserted partially into the die D–5 by the forward movement of the punch 262. The punch 262 moves the blank W–4 axially into the die D–5 to the position shown in FIG. 22.

As the header slide 31 approaches the die breast 30 at the fifth work station, the punch 262 moves into the blank W–4 and advances the blank axially into the die D–5. The retractor pins 261 are engaged by the tool holder 284 fixed to the header slide and, as the header slide approaches the position shown in FIG. 22, the knock-out sleeve assembly in the die breast, including sleeves 232, 231 and 240, is moved to its retracted position. During this phase of the header slide movement the nose 263 of the punch 262 bears against the web in the blank W–4. The punch assembly, incuding the back-up member 281, advances the punch 262 by reason of the member 280b carried by the header slide. The sleeve 266 around the punch may be moved back into the header slide as permitted by the lever 283a.

The head 265 of the punch 262 bears against the underside of the member 287 always. When the workpiece W–4 is finally bottomed against the edge of sleeve 232, then the header slide lever indicated at 280b moves to the full line position shown in FIG. 22. This motion is effective to punch out the web 290 of the blank. In FIG. 22 the slug 290 is severed from the blank and is located within the sleeve 232. Now, as the header slide begins to retract from the die breast, the springs 260 cause the sleeve 232 to follow the blank as it moves away from the die breast. Thus the springs 260 maintain the punched-out blank W–5 in sleeve 232 as the header slide retracts.

The slug 290 is maintained in sleeve 232 until the next stroke of the machine. Each successive slug 290 moves along the axial passage 254, eventually dropping out at the front of the machine. When the header slide reaches its fully retracted position the stripper sleeve 266 is urged forward by the action of knock-out rod 283a as it comes solid against the bed slightly before the header slide has reached its most backward position. This forces sleeve 266 to stop while punch 262 is pulled through sleeve 266.

The nose portion 264 of the punch burnishes and smooths the interior 291 of the skirt portion 163 of the finished blank W–5 as the punch reaches its forward-most position.

This small slug 290 is the only material of the original workpiece blank which does not become a part of the finished article in the present process. The slug represents about 7% of the starting material.

The completed workpiece after the fifth work operation is shown in FIGS. 6, 12, 13 and 14. It is substantially identical to the uncompleted workpiece shown in FIG. 5, except that the cavities in its opposite ends are joined to each other by a through-passage 291. The same reference numerals are used in FIGS. 6, 12, 13 and 14 as are used for the corresponding parts of the unfinished workpiece shown in FIG. 5.

Figures 3A, 13:
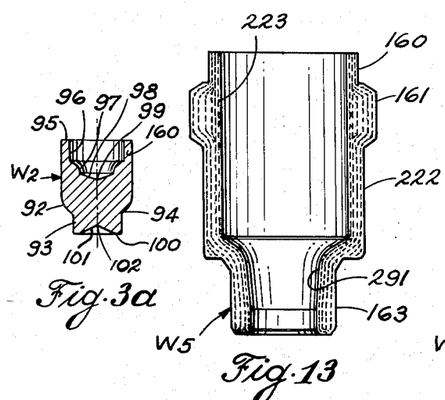
FIG. 3A is a view similar to FIG. 3 and illustrating a modified form of the workpiece at the conclusion of the second forming operation.
FIG. 13 is a lengthwise sectional view taken centrally through the workpiece and showing in dashed lines the grain flow characteristics of the finished spark plug shell.

If desired, at the second work station the punch may be designed to form a cylindrical collar on the upper end of the workpiece, so that the latter will have the configuration shown in FIG. 3A. If this is done, the finished workpiece will have a longer collar 160.

Any variation in the sizes of the starting blanks will produce corresponding variations only in the length of this collar, the other dimensions of the finished product being unaffected. Since the collar is machined later, such variations in its length are of no consequence.

Operation

A coil of wire or length of rod stock having a diameter such as illustrated by the blank W (FIGS. 1 and 7) is advanced into the die breast by feed rolls, or the like, as will be understood by those skilled in the art. Such stock is intermittently advanced into the shear assembly indicated at H in FIG. 15. The shear assembly H is moved in timed relation to the reciprocating header slide 31 so as to shear off a blank of rod stock and the cut blank is elevated by the shear assembly so as to be disposed in alignment with the first die D-1. Reference is made to Friedman Patent No. 2,762,108 disclosing a shear and its mode of operation corresponding to that employed in the instant apparatus.

As the header slide tool T-1 approaches the die breast, the cut blank is pushed out of the shear assembly and into the first die D-1 (see FIG. 16). The blank W-1 resulting from the operation in die D-1 is transferred to the next work station at D-2. At the second work station the blank is extruded for a part of its length and the end faces of the blank are formed by the dies and punches described above to produce the extruded and recessed blank W-2. The blank W-2 is ejected from the die D-2 as above described and, as it is ejected, the blank W-2 is picked up by the transfer and carried to the third work station in alignment with the die D-3.

At the third work station the header slide 31 approaches the die breast and moves the blank W-2 into the die D-3. The header slide tools at the third work station include the punch holder assembly 147-149 which is movable with respect to the header slide 31. The assembly 147-149 is spring-biased forwardly of the header slide so as to enclose the end of the punch 130. The stripper sleeve 144 around the punch 130 is also advanced to its forward position by means of the pins 146 and the header slide lever 132b. Upon full advance of the header slide 31 to its most forward or dead-center position, the punch holder assembly 147-149 is moved back into the header slide so that the punch 130 projects beyond the sliding assembly and into the blank. As the punch 130 is advanced into the blank, the stripper sleeve 144 is permitted to retract to the punch holder 147. FIG. 19 illustrates the position of the parts which shape the blank at the forward dead-center position of the header slide. The blank W-3 is formed in the die D-3 and, after completion of the work at the third work station, the blank W-3 is moved out of the die D-3 into the waiting transfer fingers and carried to the next work station in alignment with the die D-4.

At the fourth work station D-4 the punch assembly, including the punch 200, the back-up member 202 and the tool holder 208, are fixed in the header slide 31. The back-up member 202 is retained in fixed position in the header slide by the member 31a which overhangs the back-up member 202. Accordingly the punch 200 is advanced into the blank W-3 in direct response to header slide movement. The punch stripper assembly, including the sleeve 216, the pins 219 and the member 221, maintain the stripper sleeve 216 in its forward position by reason of the header slide lever 31b engaging the member 221. As the header slide 31 approaches forward dead-center position, the lever 31b permits the stripper assembly, including the sleeve 216, to move away from the die breast or retract into the header slide as illustrated in FIG. 21. The punch 200 and the die D-4 operate as heretofore described in detail to extrude the major portion of the blank along the punch 200, as shown in FIGS. 21 and 5, to produce the blank W-4. After completion of the forming operation at the fourth work station, the blank is ejected by the knock-out assembly, including knock-out 199 and piercer 186, into the transfer fingers for transfer to the fifth work station.

Figure 6:
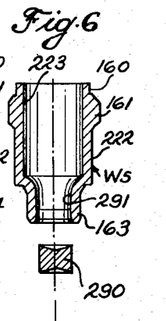

At the fifth work station the web remaining within the blank W-4 is punched out in the form of the slug 290 illustrated in FIG. 6 and as shown in FIGS. 22 and 23. In the fifth work station a tool holder 284 on the header slide 31 operatively engages the retractor pins 261 mounted in the die breast. The punch 262 carried by the header slide is moved with the header slide by reason of the back-up member 281 and the overhanging member 280b carried by the header slide 31. After the slug 290 is punched out, the knock-out rod 283a advances the stripper assembly to push the blank off of the punch 262 at the completion of the operation in the fifth work station. FIG. 23 illustrates the blank W-5 as still hanging on the end of the punch 262.

The knock-out assembly 253 and 247 is normally spring-biased to urge the retractor pins 261 towards the header slide. Accordingly, it will be understood that the engagement of the tool holder 284 with the pins 261 overcomes the bias of the spring 260 and moves the knock-out assembly to the position shown in FIG. 22.

Figure 14:
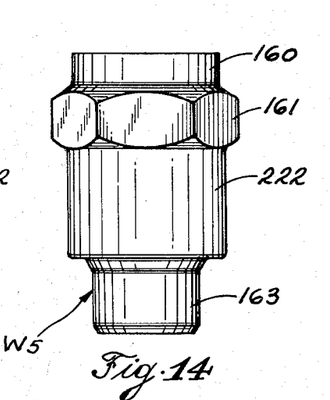
FIG. 14 is an enlarged elevational view of the finished spark plug shell.

The spark plug shell, as shown in FIGS. 13 and 14, is ready for threading at the lower end and assembly with a ceramic core to complete the spark plug. The finished article has the desirable flow path and grain structure illustrated in FIG. 13 wherein the flow lines follow the contour of the finished article. The slug 290 which is punched out of the blank at the last work station represents less than 10% of the starting material so that great economies in manufacture are accomplished with the process and apparatus of the instant invention as compared to the prior art.

Since the operation carried out on the blank at the first work station is, in effect, a sizing operation to "true up" the ends of the blank, and the operation at station five is a punching operation, the three operations at work stations 2, 3 and 4 are the only forming stations. Thus the machine for making the complete shell is minimized with respect to its transverse width. This means that a reduction in the distance across the die breast is accomplished by reducing the number of work stations and thus economies in the manufacture of the apparatus are effected by the method provided herein.

Each of the forming operations is accomplished without causing excessive work hardening in any particular area of the blank. The avoidance of high unit stress and the attendant localized work hardening permits the blank to be worked in the steps described without any annealing between any of the steps.

An important and advantageous feature of the present invention is the fact that the deformation of the workpiece takes place in a gradual and progressive manner. At the second work station, the workpiece is lengthened only a relatively slight amount, the reduced neck portion at one end of the workpiece is only partially formed, and the opposite end cavities in the workpiece are only partially formed. At the third work station the over-all length of the workpiece is increased only slightly, as will be apparent from a comparison of FIGS. 3 and 4, and the deformation which takes place as a result of the deepening of the opposite end cavities is accommodated by the formation of the enlarged hexagonal portion 161 and the lengthening of the reduced neck portion 163.

The greatest change in the over-all length of the workpiece takes place at the fourth work station, as shown by a comparison of FIGS. 4 and 5. It will be noted that this large change takes place only after the thickness of the workpiece material against which the punch and die arrangement operates has been reduced appreciably.

Because of this, the rather severe deformation which takes place in the fourth work station can be accomplished without undue difficulty. Furthermore, at the completion of the fourth pressure-forming operation the workpiece is in its final external shape and length. The only thing remaining is to sever the slug 290 which separates the opposite end cavities in the workpiece. Accordingly, any deterioration in the workability of the workpiece as a result of the rather severe deformation which takes place at the fourth work station is of no practical consequence since no further cold working of the workpiece is required.

From FIG. 13 it will be apparent that the flow lines in the metal of the workpiece substantially follow the external contour of the workpiece, so that the finished shell has maximum strength.

The fact that there are only relatively few operations required in the present process makes it possible to use, with a minimum of modification, a machine of the same general type as that disclosed in the aforementioned U.S. Patent No. 2,542,864, which has been used previously for manufacturing much simpler shaped articles, such as nuts. In the machine of that patent there are five work stations and it is a relatively simple modification to provide the particular die and punch arrangements of the present invention at those five work stations so as to adapt the machine to the manufacture of spark plug shells. Also, it is a simple matter to modify the automatic transfer mechanism of the said patent to operate in the manner intended for the illustrated embodiment of this invention.

Although I have shown and described my method and the apparatus preferred for carrying out the method in considerable detail, it will be appreciated by those skilled in the art that numerous modifications may be made therein without departing from the scope of the invention as defined in the claims. In describing the apparatus reference is made to the die breast and header slide in a machine wherein the bed frame is normally horizontally disposed. Such a machine is illustrated diagrammatically in FIG. 15. It will be appreciated that the apparatus disclosed herein may be used in nut and bolt forming machines wherein the bed frame is vertically disposed and the header slide reciprocates vertically.

What is claimed is:

1. The process for making a ferrous metal spark plug shell which comprises cutting a cylindrical blank from rod stock, pressing the cut blank axially in a die having a gradually reduced diameter to partially point one end of the blank, thereafter extruding said partially pointed end of the blank for less than half of the length of the blank and axially pressing the blank from opposite ends to form a recess in the un-extruded end of the blank, thereafter extruding said extruded end of the blank a second time and piercing substantially unworked metal of said blank adjacent the recessed end of the blank outwardly into a hex die, thereafter extruding substantially unworked metal of the blank between that portion which has been spread into a hex die and said extruded end of the blank along an extruding punch to form a cylindrical cup in the major portion of the blank, and thereafter punching out the web from the portion of the blank which was twice extruded.

2. The process for making a ferrous metal spark plug shell which comprises cutting a blank of rod stock, pressing the cut blank axially in a die to chamfer one end of the blank without substantial piercing of said blank, thereafter extruding said chamfered end of the blank for a portion of its length and axially pressing the blank from opposite ends to form recesses in the ends of the blank, thereafter further extruding said extruded end of the blank and radially displacing substantially unworked material at the opposite end of the blank outwardly into a hex die, thereafter extruding substantially unworked material of the end of the blank which has been spread into a hex die along an extruding punch to form a cylindrical cup in the major portion of the blank, and thereafter punching out the web from the portion of the blank which was first extruded.

3. A process of making an elongated hollow spark plug shell of steel or the like from a shorter workpiece of solid, cylindrical cross-section which comprises the steps of inserting said cylindrical workpiece at a first work station into a die having a gradually reduced diameter, exerting endwise pressure against the workpiece in said die to deform the workpiece so as to provide thereon a reduced portion at one end and a depression in the end face of the workpiece at that end, leaving the remainder of the workpiece substantially unchanged, thereafter removing said workpiece from the die at the first work station and advancing said workpiece directly to a second work station without intermediate heat treatment of the workpiece between said first and second stations; inserting said workpiece into a die at the second work station, applying endwise pressure against the workpiece in the said last-mentioned die to form a relatively shallow first cavity in said reduced end of the workpiece, and to extrude said reduced end of the workpiece into a smaller diameter cylindrical neck having an axial length less than half the length of the workpiece, and to form a substantially deeper second cavity in the opposite end faces of the workpiece, leaving the outside diameter of the workpiece substantially unchanged beyond said reduced neck, removing said workpiece from the die at the second work station, advancing said workpiece directly from the second work station to a third work station without heat treatment of the workpiece between said second and third work stations; inserting said workpiece into a die at the third work station and, while the workpiece is in said last-mentioned die, exerting endwise pressure against the workpiece to deepen said shallow cavity, and to further extrude the workpiece material into said reduced diameter neck to lengthen the latter, and to deepen said second cavity and spread the workpiece material outward around said second cavity to form an enlarged external hexagonal portion on the workpiece, removing said workpiece from the die at the third work station, advancing said workpiece directly from the third work station to a fourth work station without heat treatment of the workpiece between said third and fourth stations, inserting said workpiece into a die at the fourth work station, while the workpiece is in said last-mentioned die applying a pressure stroke endwise against the inner end of said second cavity to extrude the workpiece material around the second cavity lengthwise opposite to the direction of said pressure stroke and thereby deepen said second cavity until its inner end is in relatively close proximity to the inner end of said first cavity, and to thereby lengthen the workpiece to a greater extent than it was lengthened during any of the preceding operations, removing the workpiece from the die at the fourth work station, advancing said workpiece directly from the fourth work station to a fifth work station without heat treatment of the workpiece between the fourth and fifth work stations; and at the fifth work station exerting an endwise force against the inner end of said second cavity to sever the workpiece material between the cavities from the rest of the workpiece and thereby form a passage connecting the respective cavities, and thereafter removing the workpiece from said fifth work station.

4. The process of claim 3 wherein said workpiece is completely confined during the respective forming operations at the first, second, and third work stations.

5. A process for making from a solid cylindrical ferrous metal blank an elongated tubular body such as a spark plug shell having an enlarged polygonal head portion, an intermediate cylindrical portion, and a reduced diameter cylindrical foot portion without annealing comprising extruding one end of the starting blank to a smaller diameter to form the foot portion, piercing substantially unworked material at the other end of the starting blank spreading it radially forming said polygonal head portion, and extruding an intermediate portion of substantially unworked material of the starting blank into a tubular shape to form an intermediate cylindrical portion, all of the steps being carried out without intermediate annealing and in the same sequence on successive blanks of a series, wherein said other end of the starting blank is pierced and displaced radially outward into a polygonal space formed by a polygonal die opening and a polygonal punch sliding therein having a cylindrical inner surface fitting around said other end of the blank thereby forming an enlarged hollow polygonal head spaced from said one end of the blank.

6. A process for making from a solid cylindrical ferrous metal blank an elongated tubular body such as a spark plug shell having an enlarged polygonal head portion, an intermediate cylindrical portion, and a reduced diameter cylindrical foot portion without annealing comprising extruding one end of the starting blank to a smaller diameter to form the foot portion, piercing substantially unworked material at the other end of the starting blank spreading it radially forming said polygonal head portion, and extruding an intermediate portion of substantially unworked material of the starting blank into a tubular shape to form an intermediate cylindrical portion, all of the steps being carried out without intermediate annealing and in the same sequence on successive blanks of a series, wherein the reduced cylindrical foot portion extruded from said one end of the blank is thereafter pierced from said one end and extruded to a greater length during the formation of the enlarged head portion, and wherein the remaining web of metal in said foot portion is punched out after the extrusion of said intermediate cylindrical portion.

7. A process for making from a solid cylindrical ferrous metal blank an elongated tubular body such as a spark plug shell having an enlarged polygonal head portion, an intermediate cylindrical portion, and a reduced diameter cylindrical foot portion without annealing comprising extruding one end of the starting blank to a smaller diameter to form the foot portion, piercing substantially unworked material at the other end of the starting blank spreading it radially forming said polygonal head portion, and extruding an intermediate portion of substantially unworked material of the starting blank into a tubular shape to form an intermediate cylindrical portion, all of the steps being carried out without intermediate annealing and in the same sequence on successive blanks of a series, wherein the starting blank is sheared from wire or rod stock and said one end of said starting blank is first pressed inwardly to a smaller diameter while said other end of said shear blank is flattened to remove shearing irregularities, and said one end is thereafter driven into an extrusion throat to extrude the reduced cylindrical foot portion.

8. A process for making an article of work hardening metal having an enlarged head portion with an internal circular passage therein, a minor portion of reduced diameter and an interior passage therein, and a cylindrical intermediate portion between said head portion and said minor portion having an internal passage joining the passages therein comprising cold working under pressure a solid cylindrical blank of work hardening metal in sequential steps including extruding substantially unworked material at one end reducing its diameter, pressing a punch into substantially unworked material of said blank within a die having an internal wall conforming to the external shape of head portion of said article flowing material to substantially completely form said head portion and said internal passage therein while maintaining the blank material to be formed into said intermediate portion substantially unworked, pressing a cylindrical punch through the internal passage formed in said head portion into unworked material radially confined in a second die having an inner wall conforming to the external shape of said intermediate portion of said article substantially completely forming said intermediate portion without substantially working of the material forming said head portion, and thereafter cutting out a slug to form a continuous passage through said portions.

9. A process for making a ferrous metal spark plug shell having an enlarged polygonal head portion with an internal circular passage therein, a tubular minor portion of reduced diameter with an internal passage therein, and a cylindrical portion between said head and minor portions having a circular passage joining the passages of said head and minor portions comprising cold working under pressure a solid cylindrical blank of substantially unworked ferrous material in sequential steps including extruding one end of said blank reducing its diameter, pressing a punch into substantially unworked material of said blank within a polygonal die radially displacing material in said die forming said polygonal head portion and said internal passage therein while maintaining the blank material to be formed into said cylindrical portion substantially unworked and simultaneously pressing an opposed punch into the extruded end of reduced diameter forming a passage therein, thereafter pressing a cylindrical punch through the internal circular passage within said polygonal head portion into unworked material radially confined in a cylindrical die extruding the cylindrical portion without any substantial working of the material forming said head portion, and extending the passages in said cylindrical portion to a location near the passage in said extruded end portion; and thereafter cutting out a slug of metal to join the passages in said cylindrical portion and said extruded end portion.

References Cited by the Examiner

UNITED STATES PATENTS

| | | | |
|---|---|---|---|
| 1,286,384 | 12/18 | Mezger. | |
| 1,354,617 | 10/20 | Lange | 313—143 |
| 1,429,017 | 9/22 | Martmill | 313—143 |
| 1,468,539 | 9/23 | McCune et al. | 313—143 |
| 1,511,199 | 10/24 | Champion et al. | |
| 1,732,827 | 10/29 | Adam et al. | 313—143 |
| 1,929,802 | 10/33 | Brauchler | 29—556 X |
| 2,170,811 | 8/39 | Cornell | 29—556 X |
| 2,393,850 | 1/46 | Wilcox | 10—76 |
| 2,436,342 | 2/48 | Wilcox | 10—76 |
| 2,682,185 | 6/54 | Lucier et al. | 78—18 |
| 2,755,543 | 7/56 | Dunn et al. | 29—535 |
| 2,874,460 | 2/59 | Riethmuller et al. | 29—535 |
| 2,891,298 | 6/59 | Kaul. | |
| 2,949,051 | 8/60 | Hoffmann et al. | 78—18 |

FOREIGN PATENTS 312,571   5/29   Great Britain.

WHITMORE A. WILTZ, *Primary Examiner.*

HYLAND BIZOT, JOHN F. CAMPBELL, *Examiners.*